April 20, 1965  R. D. WASSERMAN ET AL  3,179,787
CARBIDE WELDING ROD
Filed March 29, 1962
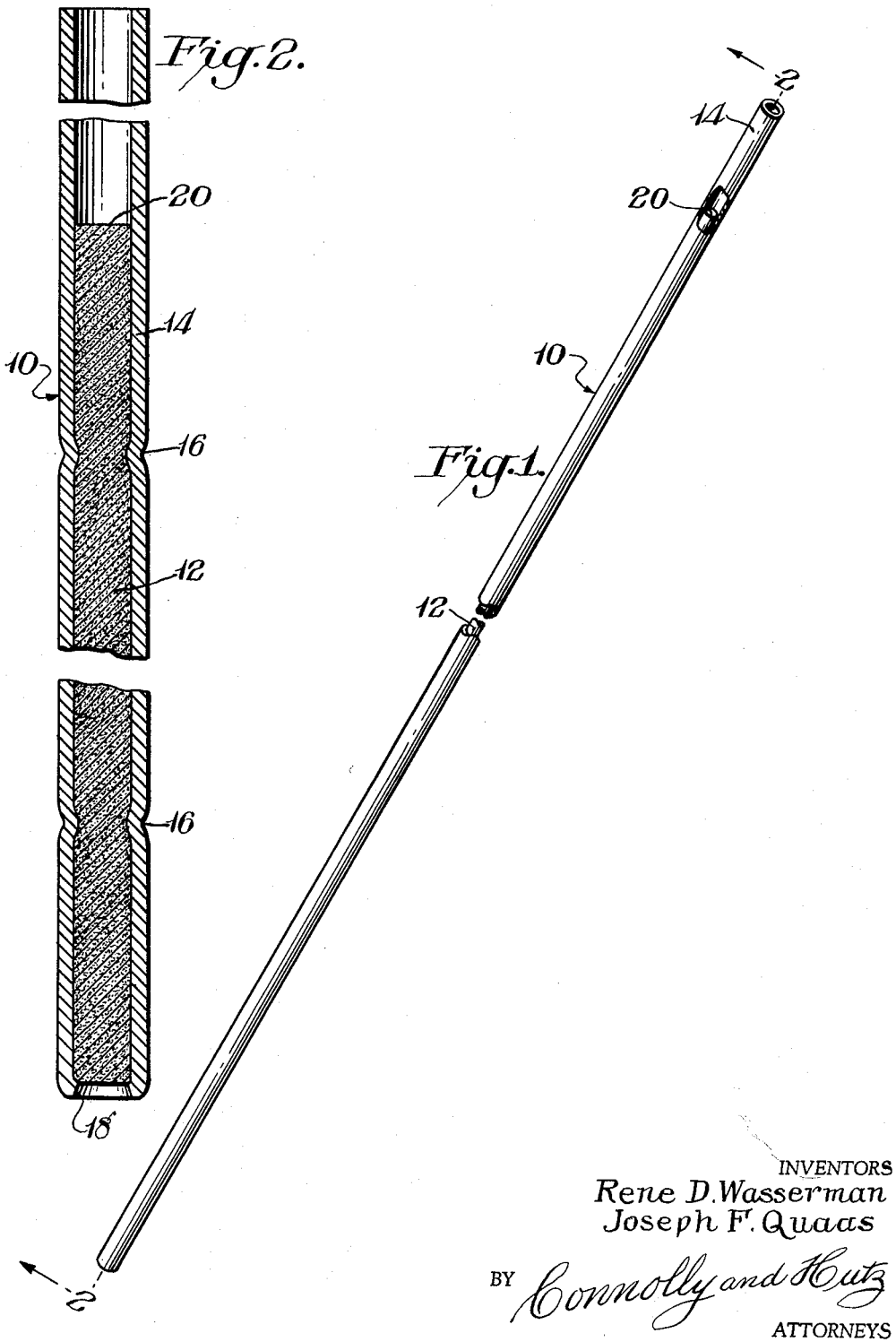
INVENTORS
Rene D. Wasserman
Joseph F. Quaas
BY Connolly and Hutz
ATTORNEYS

3,179,787
CARBIDE WELDING ROD
René D. Wasserman, Stamford, Conn., and Joseph F. Quaas, Island Park, N.Y., assignors to Eutectic Welding Alloys Corporation, Flushing, N.Y., a corporation of New York
Filed Mar. 29, 1962, Ser. No. 183,637
3 Claims. (Cl. 219—146)

This invention relates to a welding rod for depositing a carbide-laden surface layer upon a parent metal, and it more particularly relates to such a rod which deposits relatively high carbide densities.

Various welding rods have been proposed for depositing carbide surface layers upon parent metals. These rods have included carbide particles and binder metals for fusing the particles upon the parent material. However most of these existing rods have not permitted high carbide densities above 60% by weight to be deposited, and the carbide particles have also been highly susceptible to damage during deposition.

An object of this invention is to provide a welding rod for efficiently depositing high density carbide facings upon parent metals; and Another object is to provide such a rod which deposits relatively thin coatings of high carbide density with minimal damage to the carbides.

In accordance with this invention a mass of fine refractory carbide particles is compressed and sintered in the presence of small amounts of a metallic binder such as cobalt, nickel or molybdenum to fuse it together. An elongated relatively strong metal supporting rod is attached alongside the sintered carbide mass and attached to it by fusion or physical connection to prevent the brittle carbide mass from breaking during handling. This supporting rod is also capable of fusion with the fine carbide particles and the parent metal under depositing temperatures to provide a means for applying the carbide-laden surface layer upon the parent metal. The metal of the supporting rod is made of an oxidation-resistant metal or alloy to permit a high density carbide coating or surface layer which includes as much at 80% by weight of carbide to be applied upon the parent metal. The reason why such high carbide densities can be effectively deposited is not completely understood. However it is suspected that the oxidation-resistant metal alloy cooperates with the compressed and sintered core and its metallic binder to protect the carbide particles from being damaged by the welding heat with a minimum amount of binder metal required in the ultimate deposit.

An effective rod of this type may be conveniently made by inserting a sintered carbide core within a thin tube of an oxidation-resistant metal or alloy. The use of a copper base alloy such as aluminum-bronze, copper-silicon, monel or inconel in this tube provides a particularly effective form of this invention. The reason for this is not completely understood. However it might be due to the very high wetting ability of the copper alloys and their freedom from oxidation at relatively high temperature.

Novel features and advantages of the present invention will become apparent to one skilled in the art from a reading of the following description in conjunction with the accompanying drawings wherein similar reference characters refer to similar parts and in which:

FIG. 1 is a three dimensional view of one embodiment of this invention; and

FIG. 2 is a cross-sectional view taken through FIG. 1 along the line 2—2.

In FIG. 1 is shown a welding rod 10 of this invention for depositing a carbide-laden facing upon a parent metal, such as mild steel, by either torch or arc welding procedures. Rod 10 includes a sintered carbide core 12 inserted within a tube 14 and secured within it for example by inwardly crimped indentations 16 at various points about the periphery of tube 14 shown in FIG. 2. In addition the bottom end 18 of tube 14 is inwardly deformed about the bottom of core 12. FIGS. 1 and 2 also illustrate that the top 20 of core 12 is downwardly spaced a short distance, such as for one inch, from the top of tube 14 to avoid wasting the more expensive carbides in the portion of the rod gripped in a holder.

Core 12 is a sintered carbide mass, such as of tungsten carbide, incorporating a conventional carbide binder such as cobalt, nickel or molybdenum. It is made by extruding a mass of relatively fine refractory carbide particles approximately 325 mesh or finer. These refractory carbides may be composed of any one of the carbides of metals such as tungsten, molybdenum, vanadium, titanium or columbium. These particles are mixed with a small amount such as 6 or 8% of a binder metal such as cobalt, molybdenum or nickel and pressed into an elongated rod form in a hydraulic press under high pressures to densely compact the mass. This mass is then sintered in a hydrogen furnace for example at 2400° F. to cause the binder to consolidate the mass and protect the carbide particles. This mass is very hard but brittle, and it is accordingly protected from breaking by attachment to a rod of a relatively strong and durable metal. This rod may for example be made in the form of a tube 14 within which carbide mass 12 is inserted. It is also possible to extrude the carbides about the outside of the supporting rod or to insert the carbides into a strip of metal which is later rolled to form a tube which encloses the sintered carbides.

The metal of tube 14 is, for example, copper or a copper alloy such as aluminum-bronze or copper-silicon. These copper alloys are remarkably effective in minimizing any tendency of the deposited carbide-laden coating to crack, and they also decrease the coefficient of friction of the overlay. Although copper has practically no ability to form carbides it makes it possible to deposit a high density carbide-laden overlay without damaging the carbides. Other advantageous oxidation-resistant metals for tube 14 or a metal supporting rod of other form are alloyed steels such as stainless steel of various compositions including various percentages of chromium or the like and also stainless steel compositions which also incorporate quantities of nickel and the like.

The reason for the remarkable results of this invention are not completely understood, but it is believed that the high density and distribution of carbides is facilitated by the formation of intermetallic carbides in the welding heat with the carbides being protected by the oxidation-resistant metal tube which concentrates the welding heat in the outer area. The supporting metal is also far more conductive than the sintered carbide core. When used as an arc electrode with the current transmitted through the metal, it minimizes any heating of the rod in contrast to the severe overheating that occurs when welding current is transmitted through a sintered carbide. The high density of carbides also contributes maximum carbide density to the deposit. Such a welding rod therefore makes it possible to deposit hard carbide facings as thin as $\frac{1}{16}$ inch when the rod is weaved to provide wide and flat bands of wear-resistant material.

What is claimed is:

1. A welding rod for depositing a refractory carbide-laden surface layer upon a parent metal comprising an elongated compressed and sintered mass of fine carbide particles, a metallic binder cementing said mass of fine carbide particles together, an elongated relatively strong metal supporting rod disposed alongside said carbide mass, attaching means securing said carbide mass and supporting rod together to permit said supporting rod to protect said brittle carbide mass from breaking, the metal composition of said supporting rod being capable of fusion with said fine carbide particles and said parent metal, the metal of said supporting rod being a copper base alloy selected from the group consisting of aluminum-bronze and copper silicon whereby any tendency of the deposit from said welding rod to crack is minimized.

2. The welding rod as set forth in claim 1 wherein the copper base alloy is aluminum-bronze.

3. The welding rod as set forth in claim 1 wherein the copper base alloy is copper-silicon.

References Cited by the Examiner
UNITED STATES PATENTS

| | | | |
|---|---|---|---|
| 1,977,128 | 10/34 | Hawkins | 219—145 |
| 2,137,471 | 11/38 | Zublin | 219—145 |
| 2,848,596 | 8/58 | Strohmeier et al. | 219—146 |
| 3,023,130 | 2/62 | Wasserman et al. | 117—205 |
| 3,109,917 | 11/63 | Schmidt et al. | 219—76 |

RICHARD M. WOOD, *Primary Examiner.*